March 10, 1953 C. A. BARATELLI ET AL 2,630,569
EYE PROTECTIVE DEVICE

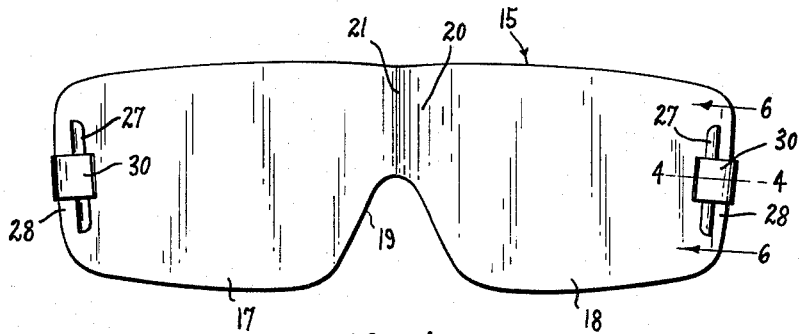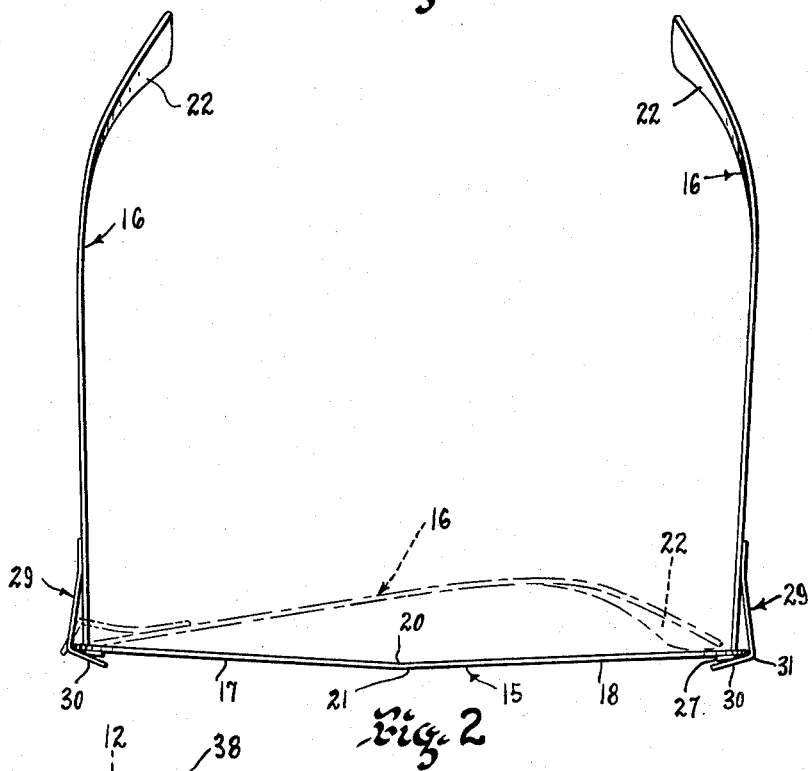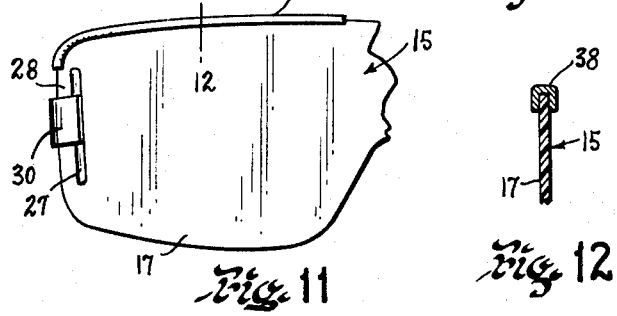

Filed June 22, 1951 3 Sheets-Sheet 2

INVENTORS
CHARLES A. BARATELLI
ROBERT C. REED
BY
Louis L. Gagnon
ATTORNEY

March 10, 1953 C. A. BARATELLI ET AL 2,630,569
EYE PROTECTIVE DEVICE

Filed June 22, 1951 3 Sheets-Sheet 3

INVENTORS
CHARLES A. BARATELLI
ROBERT C. REED
BY
Louis L. Gagnon
ATTORNEY

Patented Mar. 10, 1953

2,630,569

UNITED STATES PATENT OFFICE 2,630,569

EYE PROTECTIVE DEVICE

Charles A. Baratelli, Woodstock, Conn., and Robert C. Reed, Sturbridge, Mass., assignors to American Optical Company, Southbridge, Mass., a voluntary association of Massachusetts Application June 22, 1951, Serial No. 232,974

5 Claims. (Cl. 2—14)

This invention relates to improvements in eye protective devices and has particular reference to a device primarily adapted for use in protecting the eyes of a wearer from the glare of the sun, bright reflective surfaces or other high intensity sources of illumination.

A principal object of the invention is to provide eye protective devices of the above character which are simple in construction, light in weight and relatively inexpensive to manufacture and which will afford a high order of comfort and protection to the eyes of the wearer under normal conditions of use.

Another object is to provide an eye protective device of the above character embodying a one piece eye shield formed of transparent, flexible, sheet material having temple members connected thereto by novel hinge connections whereby the temples may be positioned in close overlying relation with said eye shield when not in use and will automatically open to position of use upon the removal thereof from a carrying case or the like.

Another object is to provide a simple, novel and inexpensive arrangement for pivotally attaching the temples to the shield type lens of a device of the above character wherein the respective temporal sides of the shield are provided with a vertical slot of a controlled length and width and the respective temples, adjacent the forward ends thereof are formed to a width slightly greater than that of the slots and are provided with an inwardly angled lip adapted to be extended through the slot and having notches in the upper and lower edges thereof in substantial alignment with the bend of said angled lips, with the base of the notches being spaced with respect to each other a distance substantially equal to the length of the slots whereby the temples may be anchored to the shield in such manner that they may be folded in a position in superimposed relation with each other overlying the inner surface of the shield and may be swung outwardly by an amount controlled by the inwardly angled lips which function as a setback for the temples when in this position and with the said temples further having resilient means thereof for retaining them in said outward position if desired.

Another object is to provide a device of the above character wherein an elongated, flat, resilient member is fixedly connected at one end to the outer side of the temple and has its other end angled inwardly to overlie and resiliently engage the adjacent edge of the lens piece or shield for retaining the temple in normally open relation with respect to said lens piece or shield.

Other objects and advantages of the invention will become apparent from the following description taken in connection with the accompanying drawings, in which:

Fig. 1 is a front elevational view of a device embodying the invention;

Fig. 2 is a top plane view of the device shown in Fig. 1;

Fig. 11 is a fragmentary front elevational view of a still further modification of the device; and Fig. 12 is an enlarged fragmentary vertical sectional view taken on line 12—12 of Fig. 11.

Figure 3:
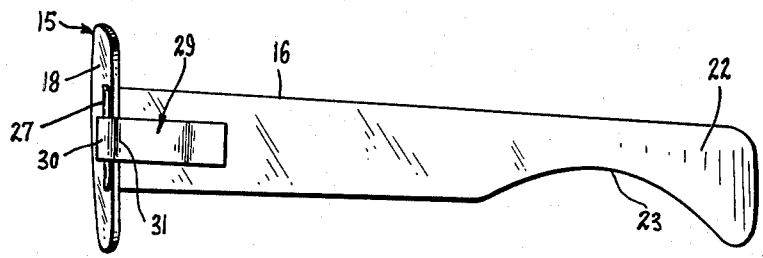
Fig. 3 is a side elevational view of the device shown in Fig. 1.

Referring to the drawings wherein like characters of reference designate like parts throughout the several views, the device embodying the invention comprises broadly a one-piece lens element or eye shield 15 having temple members 16 hingedly connected to the opposed sides thereof.

The eye shield 15 is preferably formed by economical stamping methods or the like from substantially thin resilient transparent plastic sheeting or similar resilient artificial resinous material which may be colored or provided with other desired light absorbing or altering characteristics. The eye shield 15 is also preferably divided into right and left eye portions 17 and 18 respectively by a notch 19 which is adapted, when the device is in position of use, to be positioned over the nose of a wearer. A slight bend may also be provided, if desired, in the bridge area 20 connecting the eye portions, as indicated at 21, whereby the opposed eye portions of the shield will incline slightly rearwardly as they progress outwardly from the bridge.

The temples 16 are also formed of thin resilient plastic or artificial resinous material which may, if desired, be colored to match or harmonize with the eye shield or may be clear and colorless. Each of the temples 16 is preferably provided with end portions 22 which are bent slightly inwardly (Fig. 2) and which are provided with curved recesses 23 (Fig. 3) in its lower edge whereby the temples will fit over the wearer's ears and will yieldably engage the sides of the wearer's head.

Figure 7:
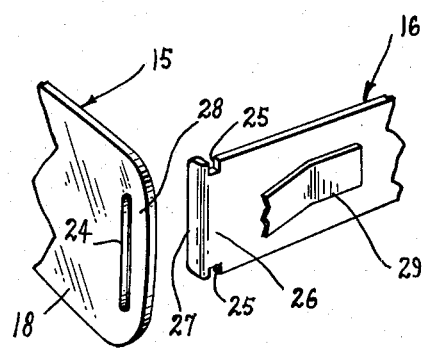
Fig. 7 is an enlarged exploded view of the portions of an eye shield and temple in the hinge area.

Adjacent the outer end of each of the eye portions 17 and 18, is a relatively narrow vertical slot 24 through which the forward ends of the respective temples 16 are adapted to extend. Each temple 16 is provided with vertically aligned notches 25 formed in the upper and lower edges thereof which are of a width only slightly greater than the thickness of the material of the eye shield 15, and the bases of the notches are so spaced as to provide a portion 26 between said notches which is substantially equal to the distance between the ends of the slots. The width of the slots 24 is only slightly greater than the thickness of the material of the temples 16 and the width of the temples 16 adjacent the notches 25 is slightly greater than the length of the slots whereby the extreme end portion 27 of each temple may be inserted through the slot 24 and positioned in such a manner that the notches 25 will interlock with the ends of the slots 24. In this way, the temples are easily connected to or disconnected from the eye shield. As an additional aid in retaining the temples in connected relation with the eye shield, the extreme end portions 27 are bent or angled inwardly to form a lip at substantially right angles to the longitudinal sides of the temples with the bend being along a line adjacent the notches 25 (Figs. 7 and 8), whereby, when the temples are spread apart as shown by solid lines in Fig. 2, the end portions or lips 27 will overlie the front surfaces of the eye portions 17 and 18 of the eye shield 15 and limit the outward movement of said temples.

Figure 4:
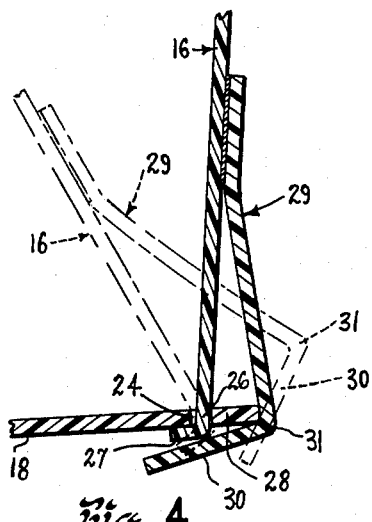
Fig. 4 is an enlarged fragmentary horizontal sectional view taken on line 4—4 of Fig. 1.
Figure 5:
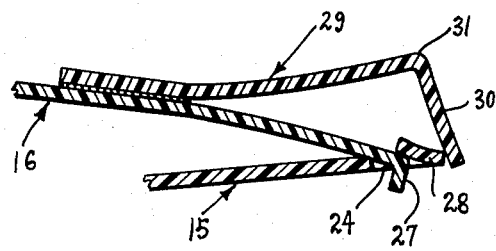
Fig. 5 is an enlarged fragmentary horizontal sectional view of the device with the temple in closed position.

Thus, it will be understood that with this connection the temples may be pivotally moved inwardly toward one another (Fig. 4) and into overlying relation with each other and with the inner surface of the eye shield 15, as shown by dot-dash lines in Fig. 2, thereby making a compact and neat arrangement such as may be easily inserted in a substantially thin packet or container.

Upon closing the temples, however, the width of the notches 25 is such that the opposed side walls thereof will engage the opposed side surfaces of the eye shield which lies between said notches and will cause the portion 28 to be deflected rearwardly out of its initial shape. Such bending is done forcefully when the temples are closed and is accomplished against the tension introduced by the inherent resiliency of said portions 28 of the eye shield. Thus, as a device of this type is withdrawn from an envelope, or similar container, the inherent resiliency of the material of the eye shield, and particularly of the portion 28, will act upon the temple end portion 27 to cause the temples to automatically assume an open or a spaced relationship, as shown by solid lines in Fig. 2. This, of course, is done as the portion 28 of the eye shield tends to automatically return to its initial set or shape.

There is provided in the presently described device means for retaining the temples in adjusted open relation. Such means is in the form of a pair of substantially L-shaped friction members 29 each of which has one end fixedly attached to a respective temple 16 by any suitable means such as cementing, riveting or the like, and which has its opposed end disposed so as to overlie the adjacent end of the eye shield 15, thereby providing a portion 30 thereof which, when the temples are open, is adapted to overlie the front of the eye shield and adjacent end of the temple. When the temple 16 is in open position, the end of the eye shield is adapted to lie within the bend 31 of the friction member 29 and thus hold the temple in this position.

Figure 8:
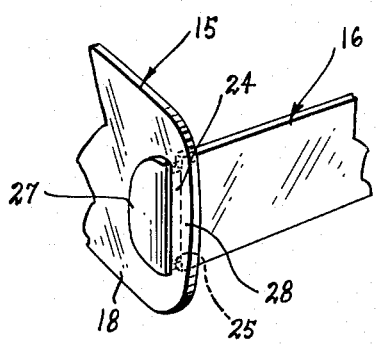
Fig. 8 is an enlarged fragmentary prospective view of a modification of the device.

It is to be understood, however, that the inherent resiliency of the portions 28 of the eye shield 15 is sufficient to overcome the frictional engagement of the friction members 29 with the ends of the eye shield whereby the temples will automatically open as described hereinbefore, and will be held in said open position by the friction members 29. If desired, however, the friction members 29 may be omitted in which instance it is preferable to enlarge the end portions or lips 27 of the temples 16 as shown in Fig. 8. This provides greater insurance against accidental disconnection of the temples from the eye shield and a slightly stiffer set-back for the temples is obtained. The remaining construction, however, is generally similar to the previously described arrangements.

Figure 9:
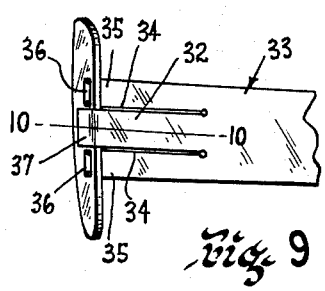
Fig. 9 is a fragmentary side elevational view of a further modification of the device.
Figure 6:
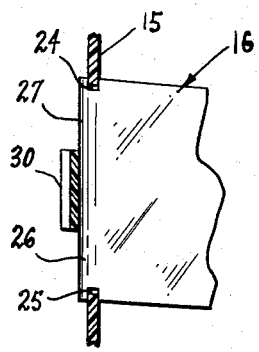
Fig. 6 is an enlarged fragmentary vertical sectional view taken on line 6—6 of Fig. 1 looking in the direction of the arrows.
Figure 10:
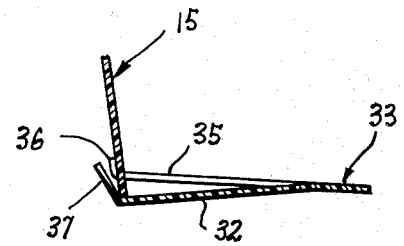
Fig. 10 is an enlarged fragmentary horizontal sectional view taken on line 10—10 of Fig. 9.

Figs. 9 and 10 illustrate a further modification of the above construction wherein the friction member indicated by the numeral 32 is formed as an integral part of the temple 33. The friction member 32 is formed by providing a pair of longitudinal spaced slots 34 in the temple 33, with the portion of the temple lying between the slots 34 forming the friction member 32. In this construction, the portion 32 is made longer than the side portions 35 and the eye shield is preferably provided with a pair of spaced slots for individual reception of the respective portions 35, the extreme ends 36 of the portions 35 being bent inwardly at nearly right angles to prevent accidental disconnection of the temple 33 from the eye shield. The friction member 32 is, of course, provided with an angled portion 37 whereby it will function similar to the friction member 29 shown in Figs. 1 through 6.

In cases where extremely thin plastic or similar sheet material is used for forming the eye shield 15, it may be desirable to provide means for imparting a degree of rigidity to the structure. This may be accomplished, as shown in Figs. 11 and 12, by inserting the upper contour edge of the eye shield 15 within an inverted U-shaped channel member 38 and fixedly connecting the channel member 38 thereto as by cementing, crimping, or other suitable means. In this manner, the eye shield will more positively retain its desired initial shape.

From the foregoing, it will be understood that there is provided a simple and efficient construction for eye protective devices whereby the devices can be manufactured in large quantities at exceptionally low cost, said construction embodying hinge means for connecting the temples to the eye shield whereby the inherent resiliency of the material of the parts will cause the temples to automatically assume an open position when the device is removed from its container and further embodying friction members for retaining the temples in open position if desired.

It will further be seen that all of the objects and advantages of the invention have been accomplished. It is apparent that many changes may be made in the details of construction and arrangement of parts shown and described, but not departing from the spirit of the invention as expressed in the accompanying claims. Therefore, it is to be understood that all matter set forth or shown in the accompanying drawings is to be interpreted as illustrative and not in a limiting sense.

We claim:

1. An eye protective device comprising a one-piece eyeshield formed of transparent resilient material shaped to have a pair of eye portions separated by a nose engaging portion, said eye portions each having a slot adjacent the end thereof, a pair of temples connected to said eyeshield, said temples each being extended through a respective slot from the rear of the device and having an angled end portion adapted to overlie the front surface of the respective eye portion of the eyeshield, said end portions being of a width slightly greater than the length of said slots, said temples each further having substantially vertically aligned notches in the opposed edges thereof adjacent the bend formed by the angling of said end portions, said end portions of the temples limiting the outward pivotal movement of the temples relative to the plane of the respective eye portions, said temples being insertable through said slots whereby said notches will be interlocked with the ends of said slots, and a stop member formed of resilient material having one end fixedly secured to a respective temple and having an angled end portion adapted to overlie the front surface of a respective eye portion of the eye shield, said stop member engaging the adjacent end of said respective eye portion with said end of the eye portion being disposed within the bend formed by the angling of said angled end portion of the stop member when the temple is open to a position substantially normal to the plane of the eyeshield.

2. An eye protective device comprising a one-piece eyeshield formed of transparent resilient material shaped to have a pair of eye portions separated by a nose engaging portion, said eye portions each having a slot adjacent the end thereof, a pair of temples connected to said eyeshield, said temples each being extended through a respective slot from the rear of the device and having an angled end portion adapted to overlie the front surface of the respective eye portion of the eyeshield, said end portions being of a width slightly greater than the length of said slots, said temples each further having substantially vertically aligned notches in the opposed edges thereof adjacent the bend formed by the angling of said end portions, said end portions of the temples limiting the outward pivotal movement of the temples relative to the plane of the respective eye portions, said temples being insertable through said slots whereby said notches will be interlocked with the ends of said slots, and a stop member formed of flat elongated resilient material having one end fixedly secured to a respective temple and having an angled end portion adapted to overlie the front surface of a respective eye portion of the eye shield, the inner surface of said stop member frictionally engaging the adjacent end of said respective eye portion with said end of the eye portion being disposed within the bend formed by the angling of said angled end portion of the stop member when the temple is open to a position substantially normal to the plane of the eyeshield.

3. An eye protective device comprising a one-piece eyeshield formed of transparent resilient material shaped with a pair of eye portions separated by a nose-engaging portion, said eye portions each having a vertically extending slot therein adjacent the end thereof, and a pair of temples connected to said eyeshield, said temples each being extended through a respective slot from the rear of the device and having an angled end portion adapted to overlie the front surface of the respective eye portion of the eyeshield, said end portions being of a width slightly greater than the length of the slots for preventing accidental withdrawal of the temples therethrough, said temples each having substantially vertically aligned notches in the opposed edges thereof adjacent the bend formed by the angling of said end portions, said slots being of a width approximating the thickness of the temples whereby when said temples are forcibly folded into overlying relation with the rear side of the eyeshield strain will be introduced into the resilient material of the eye portions adjacent said slots and when said force upon the temples is released the inherent resiliency of said resilient material will automatically cause said temples to move to positions substantially normal to the plane of the eye portions, and a stop member formed of flat elongated resilient material having one end fixedly secured to a respective temple and having an angled end portion adapted to overlie the front surface of a respective eye portion of the eye shield, the inner surface of said stop member frictionally engaging the adjacent end of said respective eye portion with said end of the eye portion being disposed within the bend formed by the angling of said angled end portion of the stop member when the temple is open to a position substantially normal to the plane of the eyeshield.

4. An eye protective device comprising a one-piece eyeshield formed of transparent resilient material shaped to have a pair of eye portions separated by a nose-engaging portion, said eye portions each having a slot adjacent the end thereof, and a pair of temples connected to said eyeshield, said temples each being extended through a respective slot and having an angled end portion adapted to overlie the front surface of the respective eye portion of the eyeshield for limiting the outward pivotal movement of the temples relative to the plane of the respective eye portions, said end portions being of a width slightly greater than the length of said slots, and said temples having a stop member of resilient material extending from the outer side thereof, said stop member engaging the adjacent end of a respective eye portion of the eyeshield and having an angled end portion overlying the front surface of a respective eye portion with said end of the eye portion being disposed within the bend formed by the angling of said angled end portion of the stop member when the temple is open to a position substantially normal to the plane of the eyeshield.

5. An eye protective device comprising a one-piece eyeshield formed of transparent resilient material shaped with a pair of eye portions separated by a nose-engaging portion, said eye portions each having a vertically extending slot therein adjacent the end thereof providing a resilient outer endpiece on the temporal sides of said eyeshield, and a pair of temples connected to said eyeshield, said temples each being extended through a respective slot and having an inwardly angled end portion adapted to overlie the front surface of the respective eye portion of the eyeshield, said inwardly angled end portions of the temples being of a width slightly greater than the length of the slots for preventing accidental withdrawal of the temples therethrough, said temples each having substantially vertically aligned notches in the opposed edges thereof adjacent the bend formed by the angling of said end portions, said notches being of a width approximating the thickness of the eyeshield, and said temples when forcibly folded into overlying relation with the rear side of the eyeshield deflecting the said resilient endpieces rearwardly from their normal position whereby when said force upon the temples is released the inherent resiliency of said endpieces will automatically cause said temples to move to positions substantially normal to the plane of the eye portions.

CHARLES A. BARATELLI.
ROBERT C. REED.

REFERENCES CITED

The following references are of record in the file of this patent:

UNITED STATES PATENTS

| Number | Name | Date |
|---|---|---|
| 2,382,962 | Courtney | Aug. 21, 1945 |
| 2,426,266 | Haas | Aug. 26, 1947 |

FOREIGN PATENTS

| Number | Country | Date |
|---|---|---|
| 206,703 | Great Britain | Nov. 15, 1923 |
| 608,059 | Great Britain | Sept. 9, 1948 |